US011351824B2

(12) United States Patent
Ueoka

(10) Patent No.: US 11,351,824 B2
(45) Date of Patent: Jun. 7, 2022

(54) TWO-WHEEL MOBILE APPARATUS

(71) Applicant: Sei Ueoka, Tokyo (JP)

(72) Inventor: Sei Ueoka, Tokyo (JP)

(*) Notice: Subject to any disclaimer, the term of this patent is extended or adjusted under 35 U.S.C. 154(b) by 122 days.

(21) Appl. No.: 17/035,757

(22) Filed: Sep. 29, 2020

(65) Prior Publication Data

US 2021/0178843 A1  Jun. 17, 2021

(30) Foreign Application Priority Data

Dec. 13, 2019 (JP) .............................. JP2019-224960

(51) Int. Cl.

| | | |
|---|---|---|
| *B60F 3/00* | (2006.01) | |
| *G05D 1/00* | (2006.01) | |
| *B62D 37/06* | (2006.01) | |
| *B62D 6/00* | (2006.01) | |
| *G05D 1/02* | (2020.01) | |
| *F16F 15/14* | (2006.01) | |

(52) U.S. Cl.
CPC ............ *B60F 3/0084* (2013.01); *B60F 3/003* (2013.01); *B60F 3/0007* (2013.01); *B62D 6/00* (2013.01); *B62D 37/06* (2013.01); *F16F 15/1485* (2013.01); *G05D 1/0011* (2013.01); *G05D 1/0278* (2013.01); *F16F 2222/08* (2013.01); *F16F 2230/18* (2013.01); *F16F 2232/02* (2013.01); *G05D 2201/0213* (2013.01)

(58) Field of Classification Search
CPC ........ B60F 3/00; B60F 3/0084; B60F 3/0007; B60F 3/003; B62D 6/00; B62D 37/06; F16F 15/1485; F16F 2222/08; F16F 2230/18; F16F 2232/02; G05D 1/0011; G05D 1/0278; G05D 2201/0213
See application file for complete search history.

(56) References Cited

U.S. PATENT DOCUMENTS

| | | | | |
|---|---|---|---|---|
| 11,046,374 | B2* | 6/2021 | Gordner | ................. B62D 37/06 |
| 2003/0060095 | A1* | 3/2003 | Gong | .................... B60F 3/0084 |
| | | | | 440/12.5 |
| 2013/0130575 | A1* | 5/2013 | Gibbs | ................... B60F 3/0084 |
| | | | | 440/12.52 |
| 2018/0178893 | A1* | 6/2018 | Gibbs | ................... B60F 3/0007 |

* cited by examiner

*Primary Examiner* — Stephen P Avila

(57) ABSTRACT

A two-wheel mobile apparatus that is movable on land and water includes a cabin and a propulsion unit. The cabin is configured to be watertight to a height above a waterline when the mobile apparatus moves on water. Further, the cabin accommodates an occupant and isolates the occupant from the outside of the cabin. The propulsion unit includes a rotatably driven impeller and moves the mobile apparatus on water. An orientation detection unit that detects orientation of the mobile apparatus. A tilt correction unit corrects tilt of the mobile apparatus on land. An oscillation reduction unit reduces oscillation of the mobile apparatus on water. An orientation control unit switches between actuation of the tilt correction unit and actuation of the oscillation reduction unit based on a detection value of the orientation detection unit.

10 Claims, 16 Drawing Sheets

TWO-WHEEL MOBILE APPARATUS

BACKGROUND OF THE INVENTION

The present disclosure relates to a two-wheel mobile apparatus.

Japanese National Phase Patent Publication No. 2017-5345008 describes a two-wheel electric vehicle including a frame, a housing coupled to the frame, a single front wheel and single rear wheel coupled to the frame, and a gyro device. The gyro device includes a flywheel and a control system. The control system controls the angular velocity of the precession of the flywheel to keep the body of the two-wheel electric vehicle balanced during a period before the two-wheel electric vehicle starts traveling immediately after the electric vehicle is activated, during a period in which the two-wheel electric vehicle is traveling normally, and during a period in which the two-wheel electric vehicle is undergoing cornering.

Japanese Patent No. 6019337 describes an electric vehicle including a front wheel, an electric motor, a battery, a rear wheel, a cabin unit, and a metal frame. The battery supplies the electric motor with power. The cabin unit includes a floor wall and a peripheral wall. The floor wall includes a floor surface of a cabin. The peripheral wall is connected to the peripheral portion of the floor wall and extended upward from the floor wall to surround the floor wall along the peripheral portion of the floor wall. The metal frame supports the front wheel, the rear wheel, and the cabin unit. The peripheral wall includes a wall opening that defines at least a lower portion of an opening used to enter and exit the vehicle. The electric vehicle further includes a door member that allows the wall opening to be opened and closed. In a projected view of the front wheel, the rear wheel, and the battery taken in a direction parallel to the transverse direction of the electric vehicle, the electric motor is located at a position where the electric motor at least partially overlaps the front wheel, and the battery is located at a position where the battery at least partially overlaps the rear wheel. The center of gravity of the electric vehicle in a light load state and a full load state is lower than the waterline. Further, the center of gravity is located at a position between the front wheel and the rear wheel in the front-rear direction of the electric vehicle.

BRIEF SUMMARY OF THE INVENTION

The present disclosure provides a two-wheel mobile apparatus that can move on land and water in a state in which an occupant is isolated in a watertight manner from the outside.

To achieve the above object, a first object of the present disclosure is a two-wheel mobile apparatus that is movable on land and water. The two-wheel mobile apparatus includes a cabin, a propulsion unit, an orientation detection unit, a tilt correction unit, an oscillation reduction unit, and an orientation control unit. The cabin includes a hatch that can be opened and closed. The cabin is configured to be watertight to a height above a waterline when the mobile apparatus moves on water, and the cabin accommodates an occupant and isolates the occupant from an outer side of the cabin. The propulsion unit includes an impeller that is rotatably driven. The propulsion unit moves the mobile apparatus on water. The orientation detection unit detects orientation of the mobile apparatus. The tilt correction unit corrects tilt of the mobile apparatus on land. The oscillation reduction unit reduces oscillation of the mobile apparatus on water. The orientation control unit switches between actuation of the tilt correction unit and actuation of the oscillation reduction unit based on a detection value of the orientation detection unit.

In a second aspect of the present disclosure, in the two-wheel mobile apparatus according to the first aspect, the tilt correction unit and the oscillation reduction unit each are a gyro device coupled to a frame of the mobile apparatus. The gyro device includes a flywheel and a gimbal. The flywheel is rotatable and includes a rotation shaft parallel to a center of gravity direction of the mobile apparatus. The gimbal surrounds the flywheel and supports two ends of the rotation shaft. The gimbal is tiltable about two gimbal shafts that intersect the rotation shaft. The gimbal shafts, which intersect the rotation shaft, are configured to be switchable between a direction parallel to a moving direction of the mobile apparatus and a direction intersecting the moving direction of the mobile apparatus.

In a third aspect of the present disclosure, in the two-wheel mobile apparatus according to the second aspect, the orientation control unit tilts the gimbal based on a roll angle change amount of the mobile apparatus that is detected by the orientation detection unit and enables activation of the tilt correction unit.

In a fourth aspect of the present disclosure, in the two-wheel mobile apparatus according to the second aspect, the orientation control unit tilts the gimbal based on a roll angle change amount of the mobile apparatus that is detected by the orientation detection unit and enables actuation of the oscillation reduction unit.

In a fifth aspect of the present disclosure, in the two-wheel mobile apparatus according to the second aspect, the orientation control unit rotates the gimbal and tilts the gimbal based on a pitch angle change amount and a roll angle change amount of the mobile apparatus that are detected by the orientation detection unit and enables activation of the oscillation reduction unit.

In a sixth aspect of the present disclosure, in the two-wheel mobile apparatus according to the second aspect, when the occupant enters the cabin in a state in which the mobile apparatus is stopped on water, the oscillation reduction unit rotates the flywheel at a rotation speed that is higher than a predetermined rotation speed so that the hatch remains above the waterline.

In a seventh aspect of the present disclosure, in the two-wheel mobile apparatus according to the second aspect, in at least one of the gyro devices, the rotation shaft is rotated about the gimbal shaft so as to extend in a direction parallel to the moving direction of the mobile apparatus, and the rotation shaft of the flywheel is connected to a rotation shaft of the impeller of the propulsion unit.

In an eighth aspect of the present disclosure, the two-wheel mobile apparatus according to any one of the first to seventh aspect further includes a remote steering unit controlled to automatically move the two-wheel mobile apparatus to a designated position based on a remote steering instruction from a user.

In a ninth aspect of the present disclosure, in the two-wheel mobile apparatus according to the eighth aspect, the remote steering unit includes a GPS reception-transmission device, a reception response device for the remote steering instruction, a moving route determination device, and an automatic steering device. The moving route determination device obtains a plurality of moving routes of the two-wheel mobile apparatus based on GPS position information and the remote steering instruction and selects an optimal route from the plurality of moving routes. The automatic steering device automatically steers the two-wheel mobile apparatus based on GPS position information of a destination and the selected moving route.

In a tenth aspect of the present disclosure, in the two-wheel mobile apparatus according to the ninth aspect, the GPS position information includes information of a present position of the mobile apparatus and position information of the destination received by the GPS reception-transmission device. Further, the user is an owner of the two-wheel mobile apparatus, a user who is registered in advance, or a remote-control center.

The first aspect of the present disclosure allows for movement on land and water with the occupant isolated from the outside in a watertight state.

The second aspect of the present disclosure prevents the mobile apparatus from tipping over on land and capsizing on water.

The third aspect of the present disclosure prevents the mobile apparatus from tipping over on land.

The fourth aspect of the present disclosure prevents the mobile apparatus from capsizing on water.

The fifth aspect of the present disclosure prevents the mobile apparatus from capsizing on water.

The sixth aspect of the present disclosure allows the occupant to easily enter the mobile apparatus on water.

The seventh aspect of the present disclosure reduces the size and cost of the propulsion unit.

The eighth aspect of the present disclosure allows the two-wheel mobile apparatus to be remotely steered and moved to a designated position.

The ninth aspect of the present disclosure allows the two-wheel mobile apparatus to be remotely steered and moved to a designated position based on GPS position information and a remote steering instruction.

The tenth aspect of the present disclosure allows the two-wheel mobile apparatus to be remotely steered and moved to a designated position based on GPS position information and a remote steering instruction by an owner of the two-wheel mobile apparatus, a user who is registered in advance, or a remote control center.

DETAILED DESCRIPTION OF THE INVENTION

One exemplary embodiment will now be described with reference to the drawings. The present disclosure is not limited to the embodiment described below. Elements in the figures are illustrated for simplicity and clarity and have not necessarily been drawn to scale. The drawings show only elements that are required to facilitate understanding.

(1) Entire Structure of Two-Wheel Mobile Device

Figure 1:
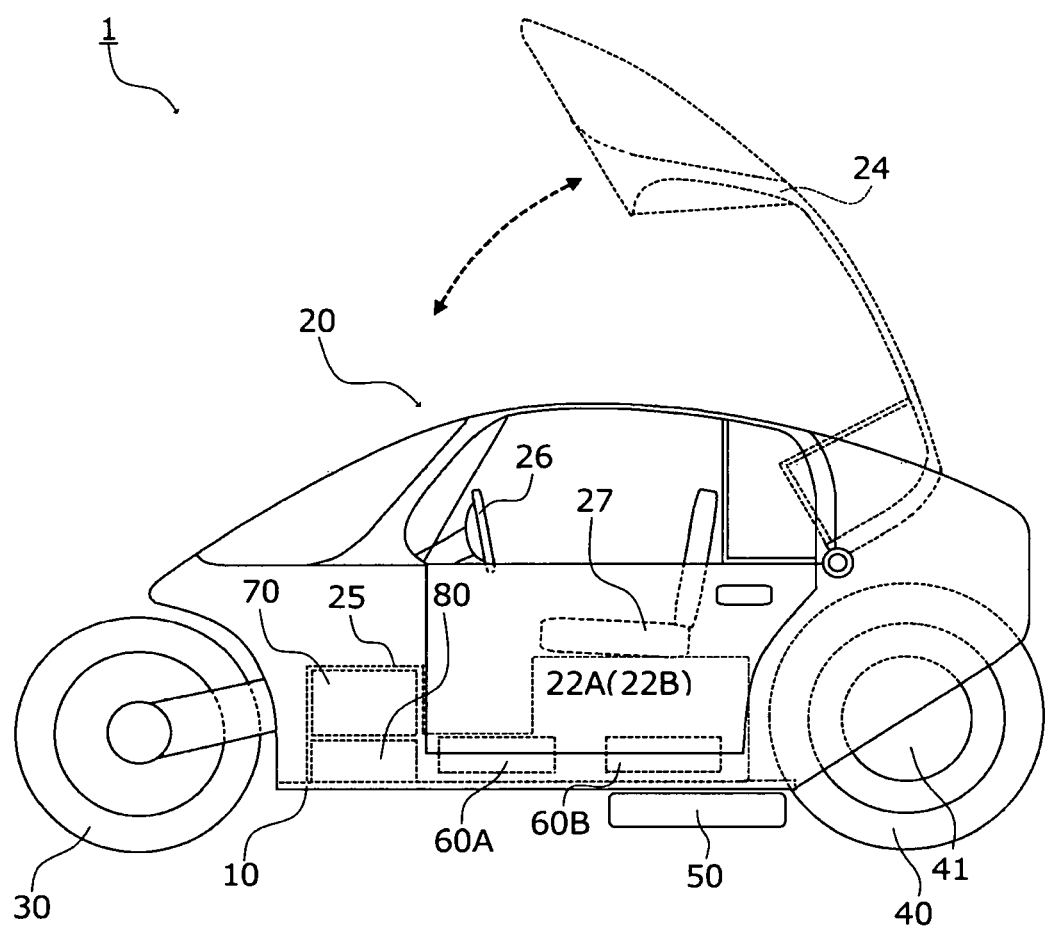
FIG. 1 is a schematic side view of a two-wheel mobile device in accordance with one embodiment.
Figure 2:
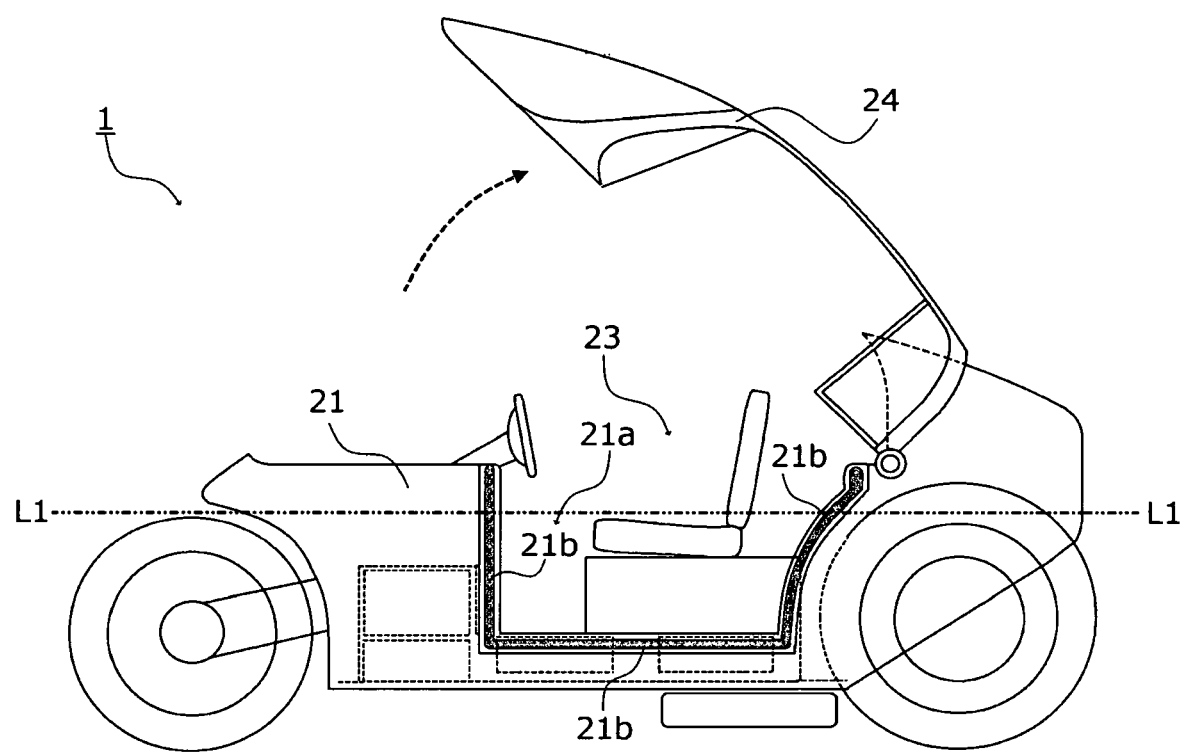
FIG. 2 is a schematic side view showing the structure of a cabin without the left and right doors.
Figure 3:
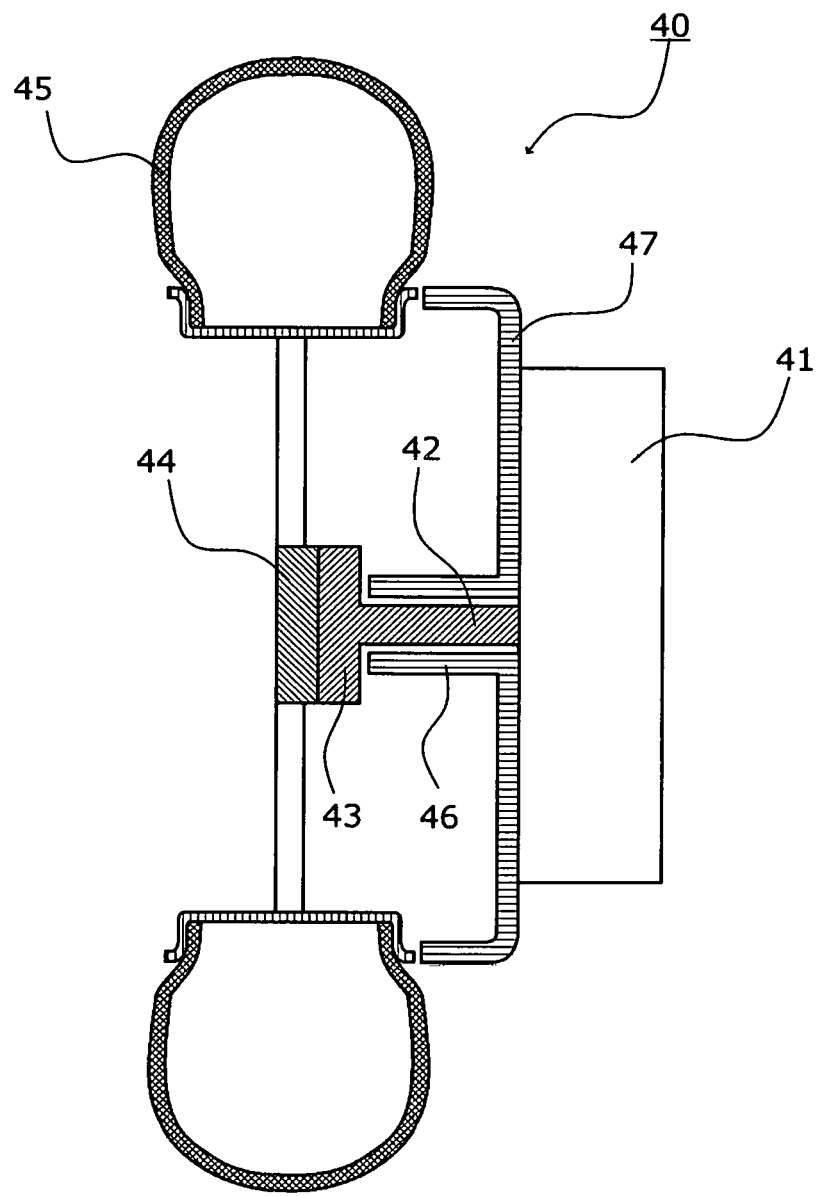
FIG. 3 is a schematic cross-sectional view illustrating how a rear wheel is driven.
Figure 4:
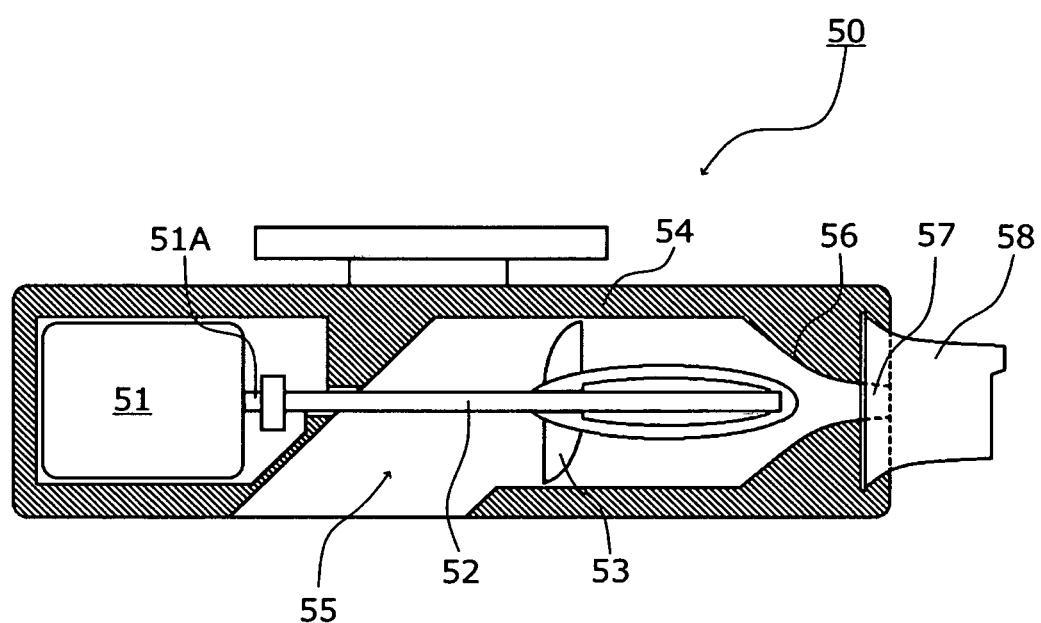
FIG. 4 is a schematic cross-sectional view illustrating the structure of a jet discharge device.
Figure 5:
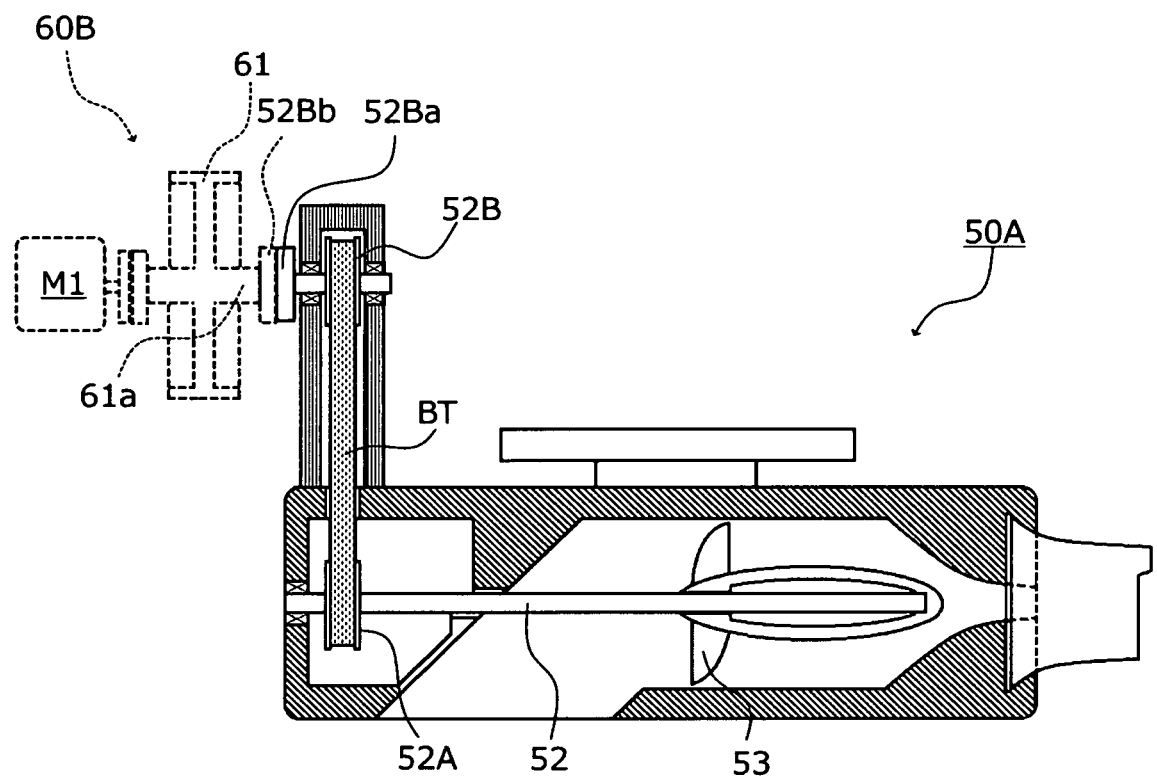
FIG. 5 is a schematic cross-sectional view illustrating the structure of a jet discharge device in a modified example.
Figure 6:
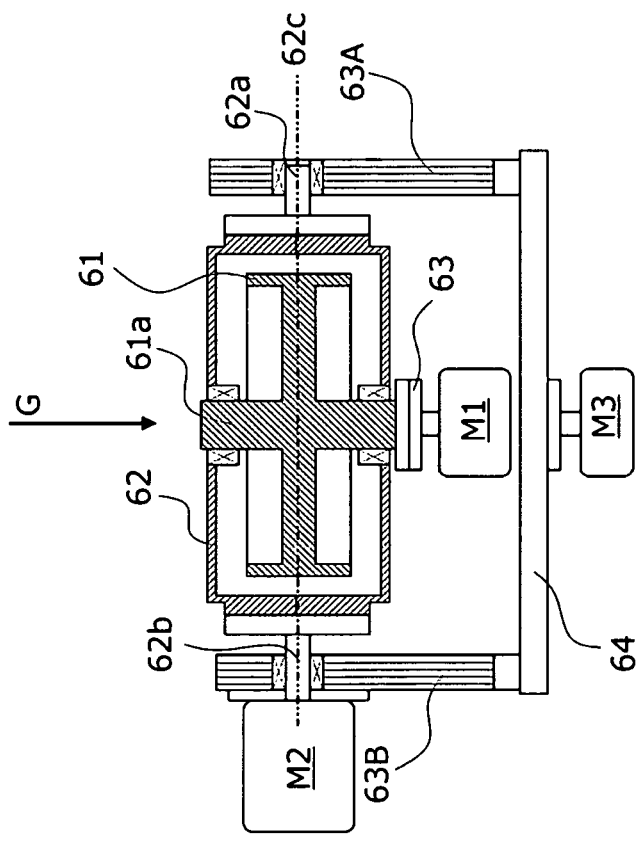
FIG. 6 is a diagram showing the structure of a gyro device.
Figure 6:
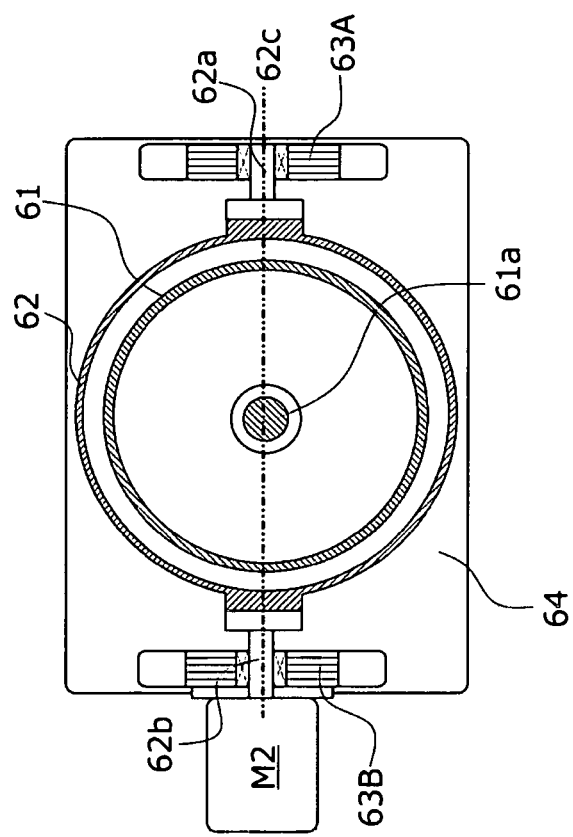

FIG. 1 is a schematic side view of a two-wheel mobile apparatus 1 in accordance with one embodiment. FIG. 2 is a schematic side view showing the structure of a cabin 20 without left and right doors 22A and 22B. FIG. 3 is a schematic cross-sectional view illustrating how a rear wheel is driven. FIG. 4 is a schematic cross-sectional view illustrating the structure of a jet discharge device 50. FIG. 5 is a schematic cross-sectional view illustrating the structure of a jet discharge device 50A in a modified example. FIG. 6 is a diagram showing the structure of a gyro device 60. The structure of the two-wheel mobile apparatus 1 in accordance with the present embodiment will now be described.

As shown in FIG. 1, the two-wheel mobile apparatus 1 includes the cabin 20, a front wheel 30, a rear wheel 40, and the jet discharge device 50, which is one example of a propulsion unit. The cabin 20 is mounted on a frame 10 and includes a steering wheel 26 and a seat 27. Gyro devices 60A and 60B, which are examples of a tilt correction unit and an oscillation correction unit, a power supply device 70, and a controller 80 are fixed to and arranged on the frame 10. The two-wheel mobile apparatus 1 can move on land and water in a state in which the cabin 20 isolates an occupant from the outside in a watertight manner.

Cabin

The cabin 20 includes a cabin body 21, left and right doors 22A and 22B, and a canopy 24. As shown by arrows in FIG. 1, the canopy 24 opens and closes a hatch 23. As shown in FIG. 2, the cabin body 21 includes substantially rectangular cutouts 21a extending downward from the upper end of the cabin body 21. The cutouts 21a partially define openings for the left and right doors 22A and 22B. The left and right doors 22A and 22B are opened and closed on land to allow the occupant to enter and exit the cabin 20 through the corresponding opening. A seal member 21b is fixed to the canopy body 21 along the edge of each cutout 21a. When the left and right doors 22A and 22B are closed, the seal member 21b along the edge of each cutout 21a seals the gap between the doors 22A and 22B and the cabin body 21. On water, this keeps the cabin 20 watertight in the draft range.

On water, the left and right doors 22A and 22B are closed to keep the cabin 20 watertight to a height above a waterline L1. Thus, the occupant upwardly opens the canopy 24 to enter the cabin 20 through the hatch 23. In this manner, the cabin 20 includes the canopy 24 and is formed to be watertight in the draft range. Thus, the cabin 20 serves as an effective shelter that safely accommodates the occupant and isolates the occupant from the outside during a disaster such as an earthquake or heavy rainfall.

Front Wheel

The front wheel 30 is the steered wheel and mounted on the frame 10. The occupant operates the steering wheel 26 to steer the front wheel 30 with a steering device (not shown).

Rear Wheel

The rear wheel 40 is the drive wheel and, as shown in FIG. 3, includes an electric motor 41, which is an in-wheel motor arranged at an inner side of the rear wheel 40, a drive shaft 42 projecting from the electric motor 41 toward the rear wheel 40 in the axial direction of the rear wheel 40, a hub 43 fixed to an end of the drive shaft 42, a wheel 44 connected to the hub 43, a tire 45 mounted on the wheel 44, a support 46 supporting the drive shaft 42, and a cover 47 entirely covering one side of the wheel 44. The cover 47 is coupled to the support 46. Further, the electric motor 41 is fixed to the support 46.

The drive shaft 42, the hub 43, the wheel 44, and the tire 45 are rotatable about a common center axis. The electric motor 41 is rotationally driven so that the tire 45 transmits rotational driving force to the road surface thereby allowing the mobile apparatus 1 to move on land.

Jet Discharge Device

As shown in FIG. 4, the jet discharge device 50 includes a drive motor 51 that has an output shaft 51A extending in the front-rear direction of the jet discharge device 50. The output shaft 51A includes an output end rotationally coupled to a pump shaft of the jet discharge device 51 by a propeller shaft 52. An impeller 53 is attached to the pump shaft of the jet discharge device 51. A tubular body 54 encompasses the impeller 53.

The tubular body 54 has a bottom surface including a water suction port 55. Water is drawn into the water suction port 55 and delivered through a water suction passage to the impeller 53. The drive motor 51 drives and rotates the impeller 53 to pressurize and accelerate the delivered water and form a jet. The jet is forced through a nozzle (ejector) 56 having a cross-sectional flow area that decreases toward the rear to obtain propulsion force when discharged out of ejection port 57 at the rear end of the nozzle 56.

A steering nozzle 58 that is swingable by a tilting shaft (not shown) in left and right directions is arranged at the rear of the nozzle 56. The steering nozzle 58 is swung in cooperation with the steering wheel 26. Thus, the occupant can turn the steering wheel 26 in a clockwise direction or a counterclockwise direction to swing the steering nozzle 58 and navigate the mobile apparatus 1 in the desired direction on water when the jet discharge device 50 is generating propulsion force.

Modified Example

As shown in FIG. 5, in a jet discharge device 50A of a modified example, a pulley 52A is attached to one end of the propeller shaft 52. The pulley 52A is rotationally connected by a belt BT to a pulley 52B. One end of the pulley 52B includes a connection flange 52Ba that is connected to a rotation shaft 61a of a flywheel 61 of a gyro device 60B. The gyro device 60B includes gimbal shafts 62a and 62b that are arranged in directions intersecting (orthogonal to) the movement direction of the mobile apparatus 1. A tilt motor M2 rotatably drives the gyro device 60B to rotate the rotation shaft 61a in a direction intersecting (orthogonal to) the gravitational force direction. In this state, the rotation shaft 61a is connectable by a connection flange 62Bn to the connection flange 52Ba. Thus, the jet discharge device 50A does not need a drive motor. This allows the size and cost of the jet discharge device 50A to be reduced.

Gyro Device

Figure 7:
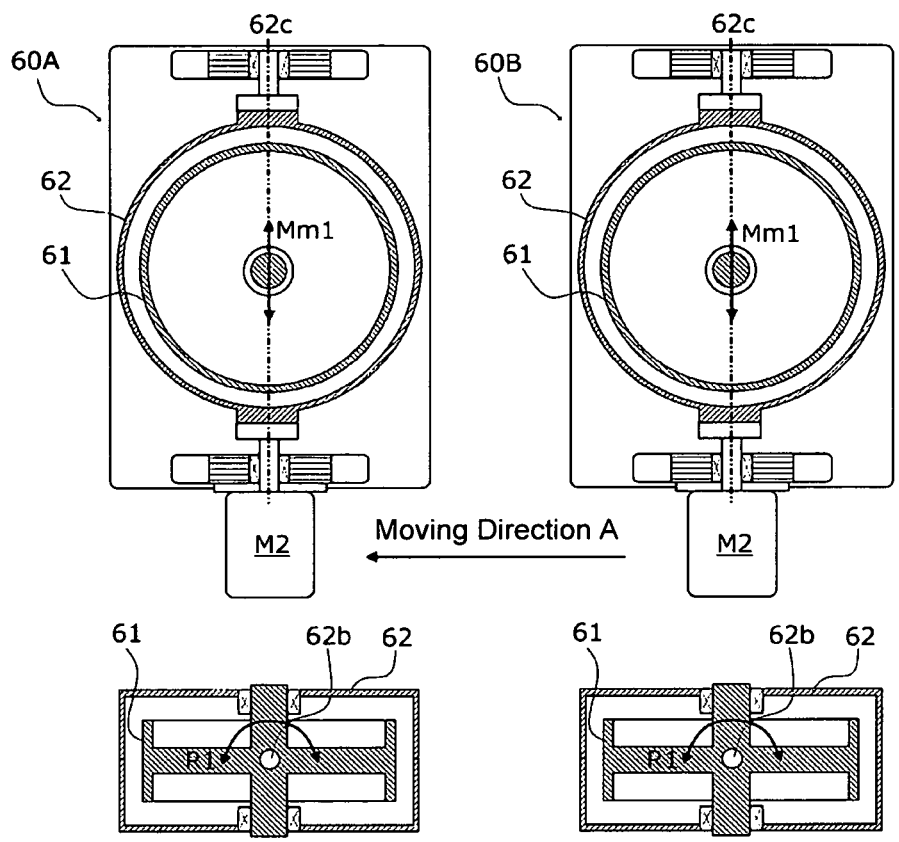
FIG. 7 is a diagram showing the arrangement of the gyro device when used as a tilt correction unit on land.
Figure 8:
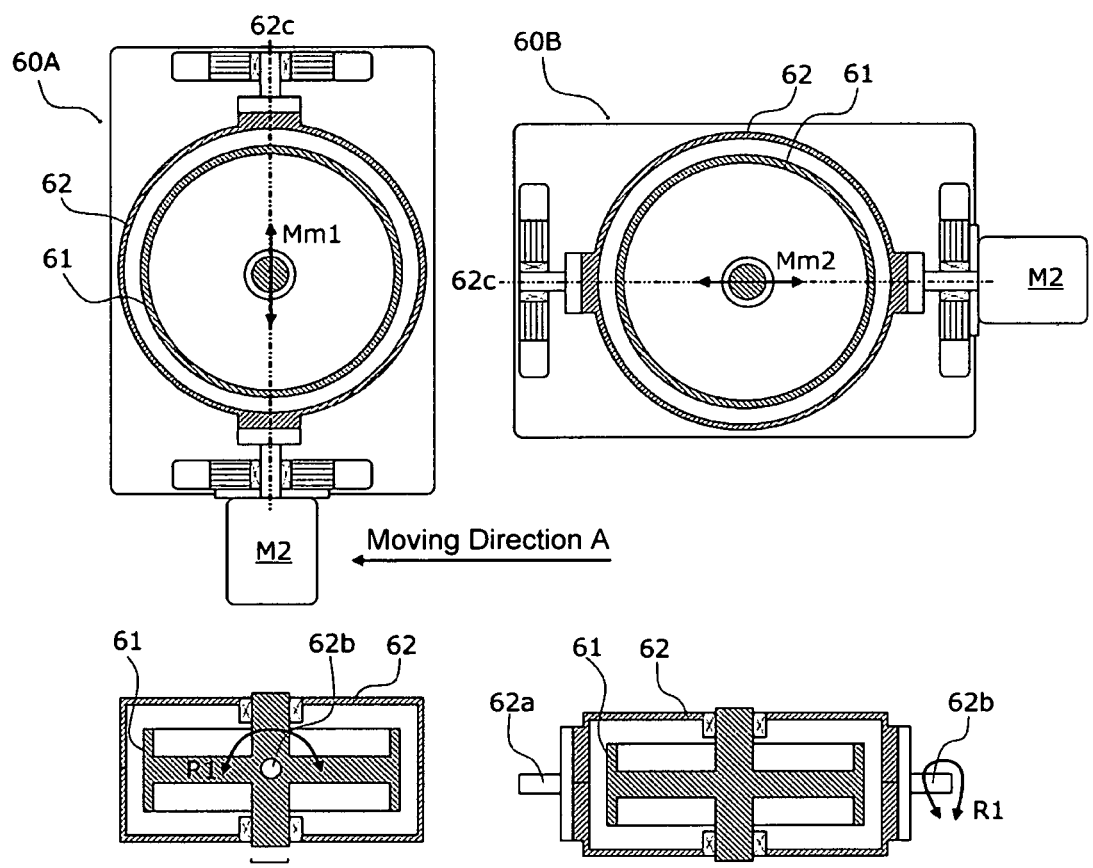
FIG. 8 is a diagram showing the arrangement of the gyro device when used as an oscillation reduction unit on water.

FIG. 6(a) is a transverse cross-sectional side view of the gyro device 60, FIG. 6(b) is a vertical cross-sectional view of the gyro device 60. FIG. 7 is a diagram showing the arrangement of the gyro device 60 when used as a tilt correction unit on land. FIG. 8 is a diagram showing the arrangement of the gyro device 60 when used as an oscillation reduction unit on water. As shown in FIG. 6, the gyro device 60 includes the flywheel 61, a gimbal 62, a flywheel motor M1, the tilt motor M2, and an actuator M3. The gyro device 60 includes the rotation shaft 61a, which is parallel to the center of gravity direction (refer to arrow G in FIG. 6(b)) of the mobile apparatus 1. The gimbal 62 surrounds the flywheel 61, supports the two ends of the rotation shaft 61a, and includes the two gimbal shafts 62a and 62b that are orthogonal to the rotation shaft 61a. The flywheel motor M1 is connected to the rotation shaft 61a by a connection flange 63 to rotate the flywheel 61 at a high speed. The tilt motor M2 tilts the gimbal 62. The actuator M3 rotates a gimbal axis 62c, which is the rotation axis of the gimbal 62, in the moving direction of the mobile apparatus 1. The gimbal axis 62c intersects (is orthogonal to) the rotation shaft 61a and configured to be rotatable in directions parallel to the moving direction of the mobile apparatus 1 and a direction intersecting (orthogonal to) the moving direction of the mobile apparatus 1.

In a state in which the mobile apparatus 1 is not tilted, the gyro device 60 adjusts the rotation shaft 61a to be parallel to the gravity of rotation direction of the mobile apparatus 1. The flywheel 61, which includes the rotation shaft 61a, is rotationally driven by the flywheel motor M1. The flywheel 61 may be an outer rotor type motor in which the rotation shaft 61a serves as a stator and the rotation shaft 61a and a tubular portion formed on the outer side of the rotation shaft 61a serve as a rotor. In this case, the gyro device 60 can be reduced in size.

In the gyro device 60, the gimbal shaft 62a is supported by a first support member 63A in a manner rotatable to the mobile apparatus 1. Further, the gimbal shaft 62b is coupled to the tilt motor M2, and the tilt motor M2 is supported by a second support member 63B. Thus, the gimbal shaft 62b is supported by the second support member 63B in a state tiltable to the mobile apparatus 1. The tilt motor M2 applies rotation torque to the gimbal shaft 62b in accordance with a control signal from a gyro sensor SR1, which is one example of an orientation detection unit.

The first support member 63A and the second support member 63B are fixed to a base 64 and supported by the actuator M3 so as to be rotatable about a rotation axis intersecting (orthogonal to) the moving direction of the mobile apparatus 1. Thus, in the gyro device 60, the gimbal axis 62c is oriented in either one of a direction intersecting (orthogonal to) the moving direction of the mobile apparatus 1 to reduce rolling and a direction parallel to the moving direction of the mobile apparatus 1 to reduce pitching of the mobile apparatus 1.

In the present embodiment, as long as the flywheel 61 is rotated at a speed greater than or equal to a predetermined rotation speed, as shown in FIG. 7, on land, the two gyro devices 60A and 60B each serve as a tilt correction unit and are arranged so that the gimbal axis 62c extends in a direction intersecting (orthogonal to) the moving direction of the mobile apparatus 1.

The gimbal 62 is rotated by the tilt motor M2 (refer to arrow R1 in drawing) in accordance with the tilt of the mobile apparatus 1 to generate a gyro moment Mm1 that reduces rolling and prevents the mobile apparatus 1 from tipping over.

As shown in FIG. 8, on water, the gyro devices 60A and 60B each serve as an oscillation reducing unit, and the gyro devices 60A and 60B each rotate the gimbal axis 62c in a direction parallel to the moving direction of the mobile apparatus 1. The gimbal 62 of each of the gyro devices 60A and 60B is rotated in accordance with the oscillation of the mobile apparatus 1 to generate a gyro moment Mm1 that reduces rolling and a gyro moment Mm2 that reduces pitching.

Power Supply Device and Controller

As shown in FIG. 1, the power supply device 70 and the controller 80 are covered by a cover 25 and arranged between the front wheel 30 and the rear wheel 40 inside the cabin body 21. The controller 80 is located downward from the power supply device 70.

The power supply device 70 is connected to the controller 80 by an electric cable C1 (not shown). The controller 80 is connected to the electric motor 41, which rotationally drives the rear wheel 40, by an electric cable C2 (not shown). The electric cable C2 extends from the controller 80 through a through hole (not shown) in the cabin body 21 to the electric motor 41. The through hole is filled with a waterproof sealing agent. Further, the controller 80 is connected to the flywheel motor M1 of the gyro device 60 and the tilt motor M2 by an electric cable C3 (not shown) and the drive motor 51 of the jet discharge device 50 by an electric cable C4. The electric motor 41, the drive motor 51, the electric cable C2, and the electric cable C4 each have a waterproof structure.

(2) Function Configuration and Operation of Mobile Device

Figure 9:
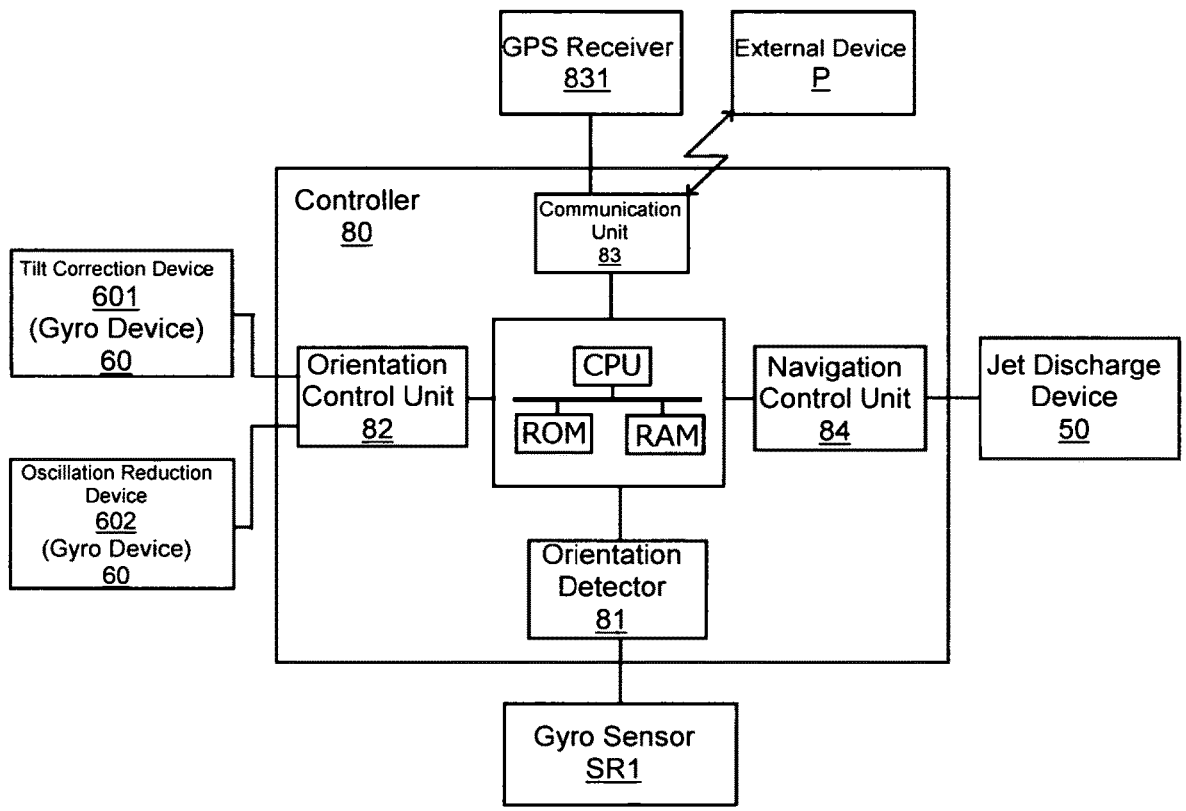
FIG. 9 is a block diagram showing one example of the functional configuration of the mobile apparatus.

FIG. 9 is a block diagram showing one example of the functional configuration of the mobile apparatus 1. The functional configuration and operation of the mobile apparatus 1 will now be described.

(2-1) Functional Configuration of Controller

The mobile apparatus 1 includes the controller 80 that has an orientation detector 81, an orientation control unit 82, a communication unit 83, and a navigation control unit 84. The controller 80 executes control programs stored in a memory to control the operation of the entire mobile apparatus 1.

The orientation detector 81 obtains a signal indicating the orientation change amount of the mobile apparatus 1 including a roll angle change amount and a pitch angle change amount of the mobile apparatus 1 detected by the gyro sensor SR1, which is one example of an orientation detection unit that detects the orientation of the mobile apparatus 1. Then, the orientation detector 81 determines the rotational drive control amounts of the flywheel motor M1 and the tilt motor M2 to generate a reverse torque required by the gyro device 60 to reduce tilt on land and oscillation on water.

Based on the rotational drive control amounts of the flywheel motor M1 and the tilt motor M2 determined by the orientation detector 81, the orientation control unit 82 switches on land and sea between a rotational drive control of the flywheel motor M1 and the tilt motor M2 executed by a tilt correction device 601 formed by the gyro device 60, which is one example of an tilt correction unit, and a rotational drive control of the tilt motor M2 and the actuator M3 executed by an oscillation reduction device 602 formed by the gyro device 60, which is one example of an oscillation reduction unit.

The communication unit 83 obtains a signal indicating the movement direction, movement speed, and absolute geographical position of the mobile apparatus 1 provided from a GPS receiver 831 arranged on the mobile apparatus 1 and position information of an external device P generated by the external device P.

Based on the movement direction, movement speed, and absolute geographical position of the mobile apparatus 10 and the position information of the external device P obtained by the communication unit 83, the navigation control unit 84 sets a navigation route connecting the present position of the mobile apparatus 10 and the position of the external device P and then drives and controls the jet discharge device 50 to move the mobile apparatus 10 along the set target route.

(2.2) Tilt Correcting Action on Land

Figure 10:
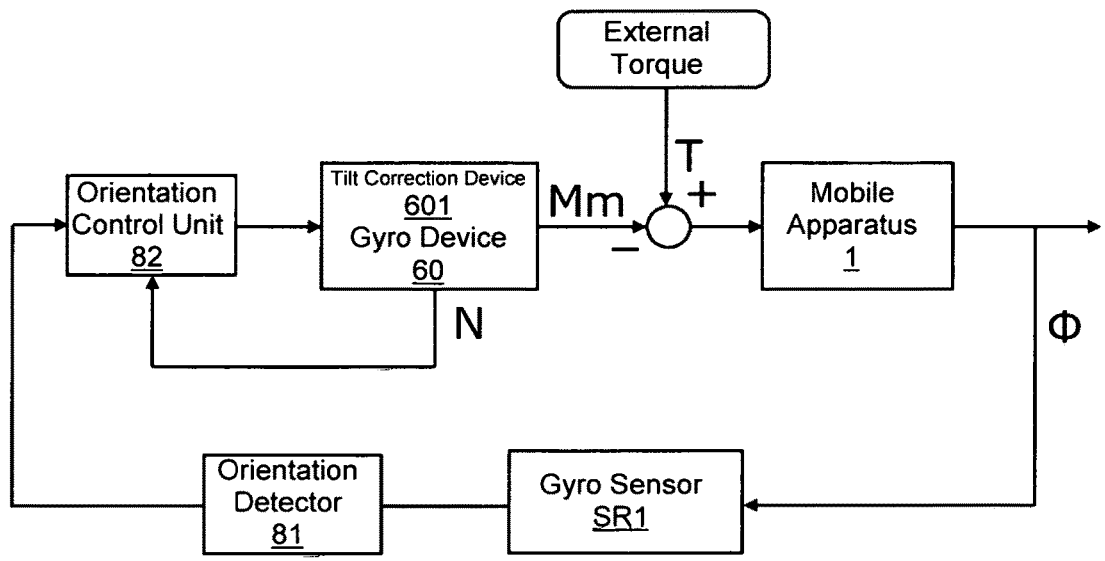
FIG. 10 is a block diagram illustrating a tilt correcting operation performed on land.
Figure 11:
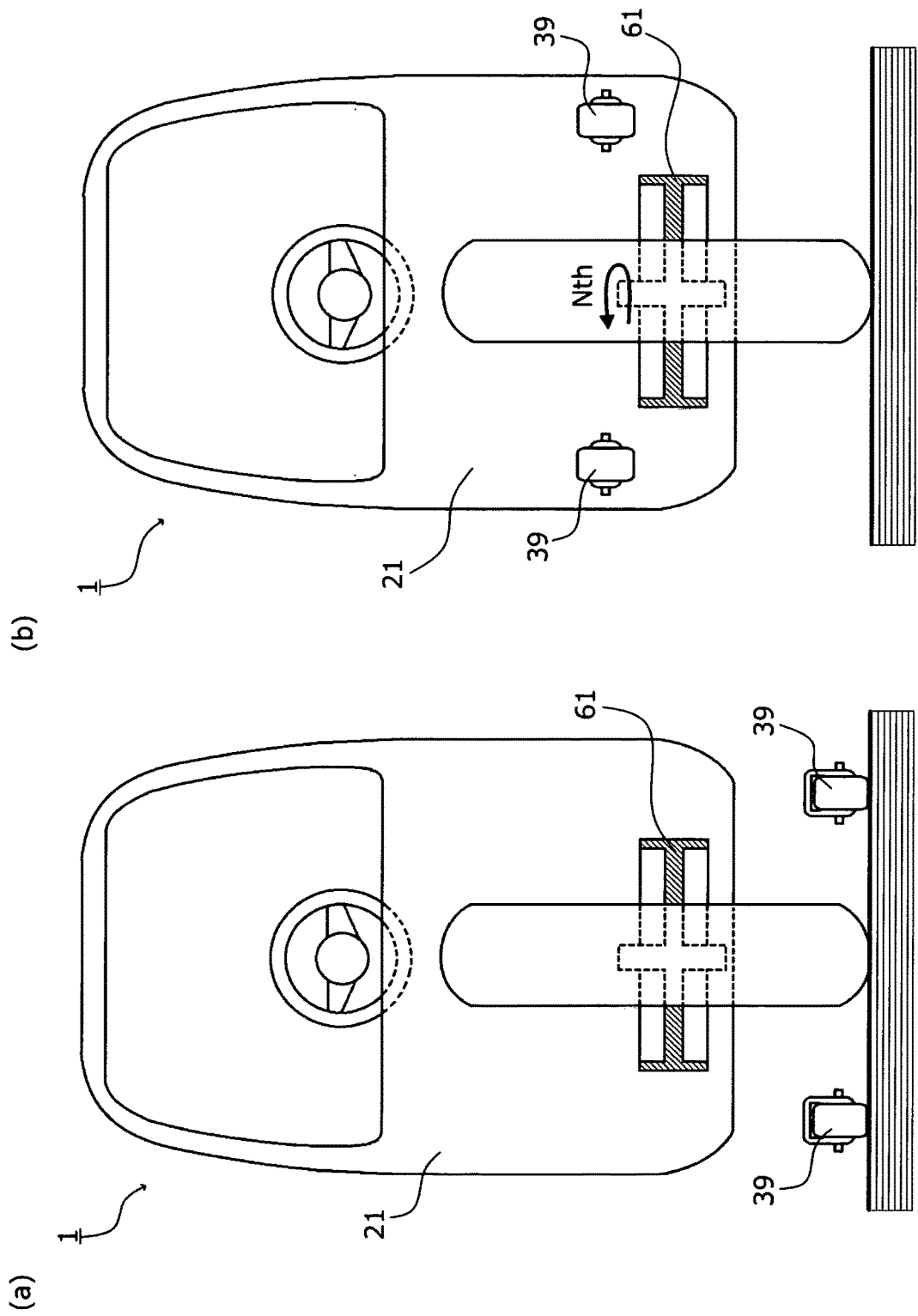
FIG. 11 is a diagram illustrating a standstill state of the mobile apparatus on land.
Figure 12:
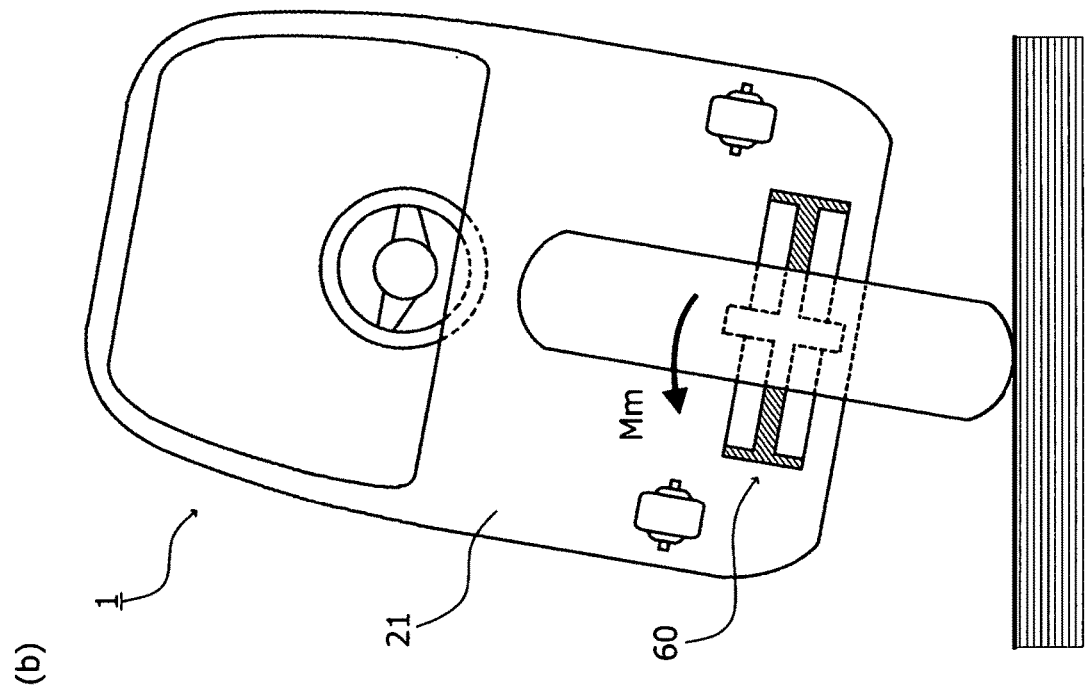
FIG. 12 is a diagram illustrating a situation in which the mobile apparatus is turning left or right on land.
Figure 12:
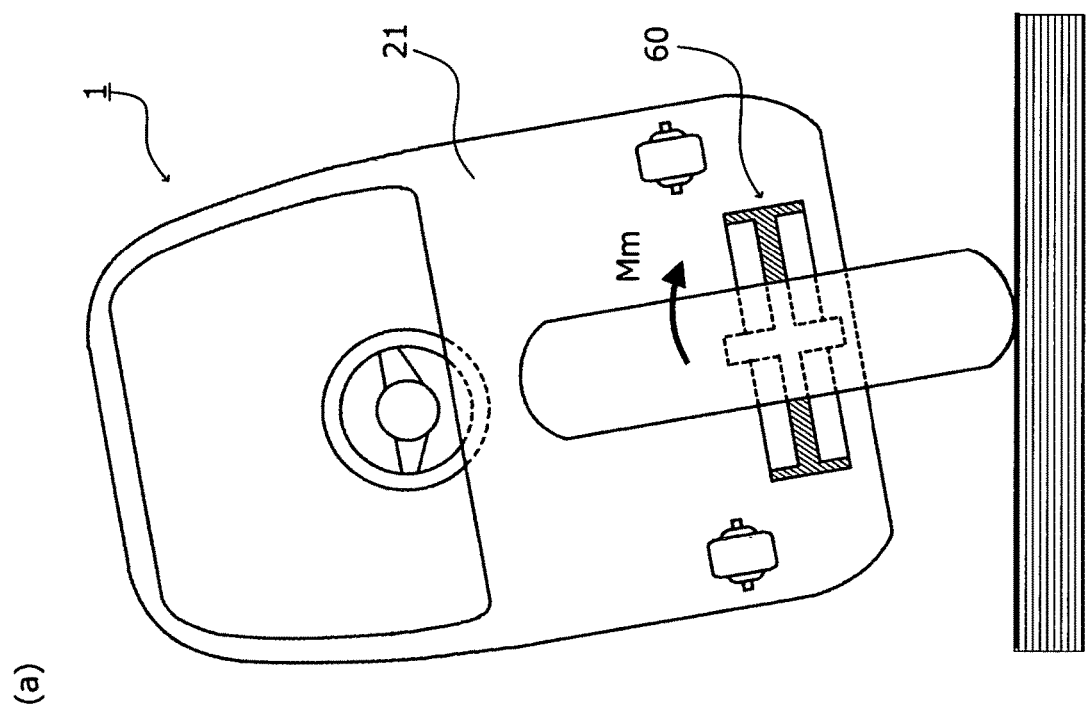

FIG. 10 is a block diagram illustrating a tilt correcting action performed on land. FIG. 11 is a diagram showing the mobile apparatus 1 is a stopped state. FIG. 12 is a diagram showing the mobile apparatus 1 when turning left or right. As shown in FIG. 10, the mobile apparatus 1 detects a roll angle change amount $\phi$, which is the tilt of the mobile apparatus 1 resulting from external torque T, with the gyro sensor SR1. Then, the mobile apparatus 1 uses the gyro moment Mm produced by the gyro device 60 as a counter torque against the tilt of the mobile apparatus 1 to stabilize the orientation.

As shown in FIG. 11($a$), when the mobile apparatus 1 is in a stopped state, auxiliary wheels 39 project out of the cabin body 21 and contact the road surface to prevent the mobile apparatus 1 from tipping over. When the controller 80 is activated, the flywheel 61 of the gyro device 60 starts to rotate. As the rotation speed N of the flywheel 61 becomes greater than a predetermined rotation speed Nth, the gyro moment Mm generated during precession becomes sufficient for maintaining the stability of the mobile apparatus 1. Thus, the auxiliary wheels 39 are retracted into the cabin body 21 and kept in an idle state as shown in FIG. 11($b$).

When the mobile apparatus 1 starts to move from the stopped state, external torque T (external force) acts on the mobile apparatus 1. When the mobile apparatus 1 tilts, for example, when the mobile apparatus 1 turns left or right, the orientation control unit 82 detects the roll angle change amount $\phi$ of the mobile apparatus 1 with the gyro sensor SR1 and rotationally drives the tilt motor M2 of the tilt correction device 601 (gyro device 60) to apply rotation torque to the gimbal shaft 62b. The rotation torque generates precession with the gyro device 60. This generates the gyro moment Mm at the gimbal shafts 62a and 62b. Thus, as schematically shown in FIGS. 12($a$) and 12($b$), the mobile apparatus 1 is moved while maintaining the balance of moment generated by centrifugal force, movement generated by gravitational force, and the gyro moment Mm generated by the gyro device 60.

The mobile apparatus 1 in accordance with the present embodiment includes the tilt correction device 601, which is formed by the gyro device 60. This keeps the orientation of the mobile apparatus 1 stable when the occupant is in the cabin 20 isolated from the outside. Thus, for example, when a disaster such as an earthquake or heavy rainfall occurs, the mobile apparatus can move more easily than a four-wheel vehicle through traffic while the occupant remains in the cabin 20 protected from the outside.

(2.3) Oscillation Reducing Action on Water

Figure 13:
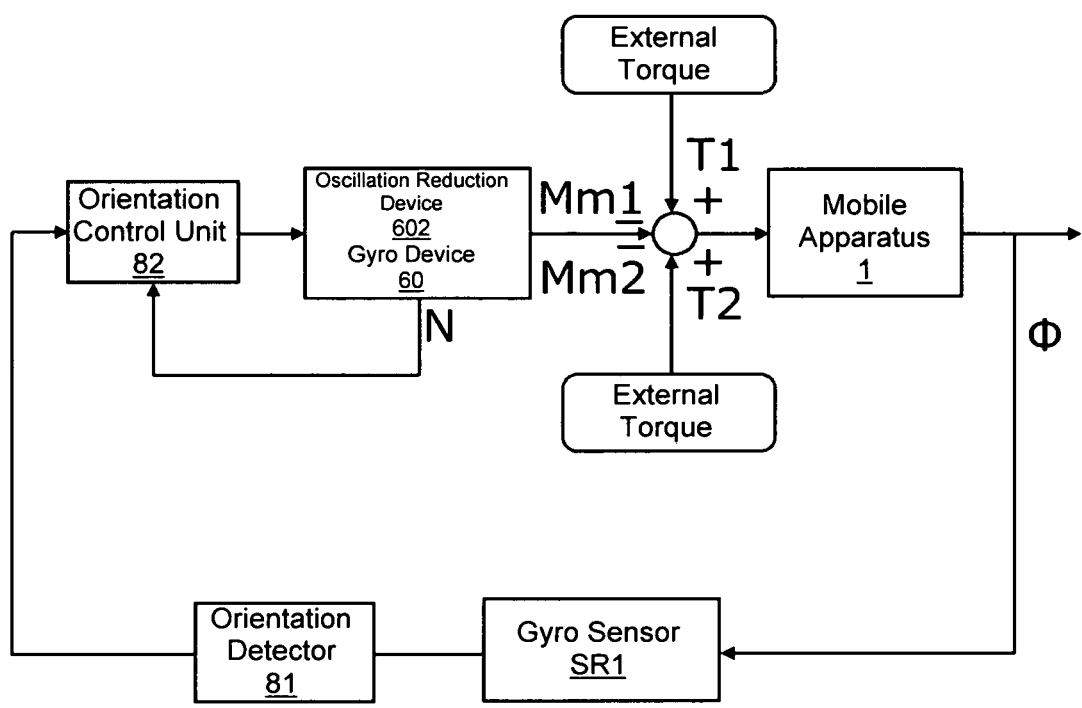
FIG. 13 is a block diagram illustrating an oscillation reduction operation performed on water.
Figure 14:
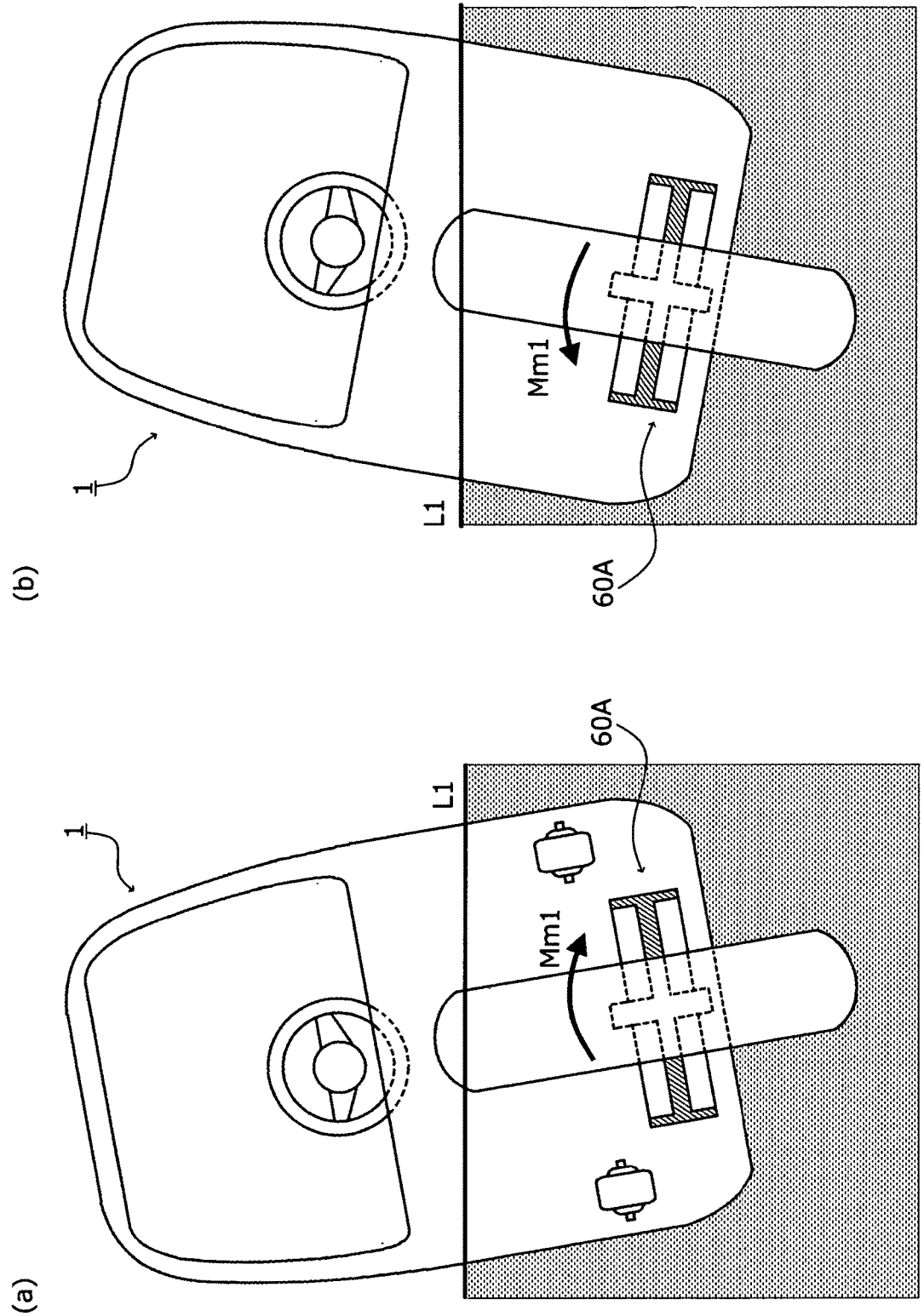
FIG. 14 is a diagram illustrating roll reduction of the mobile apparatus on water.
Figure 15:
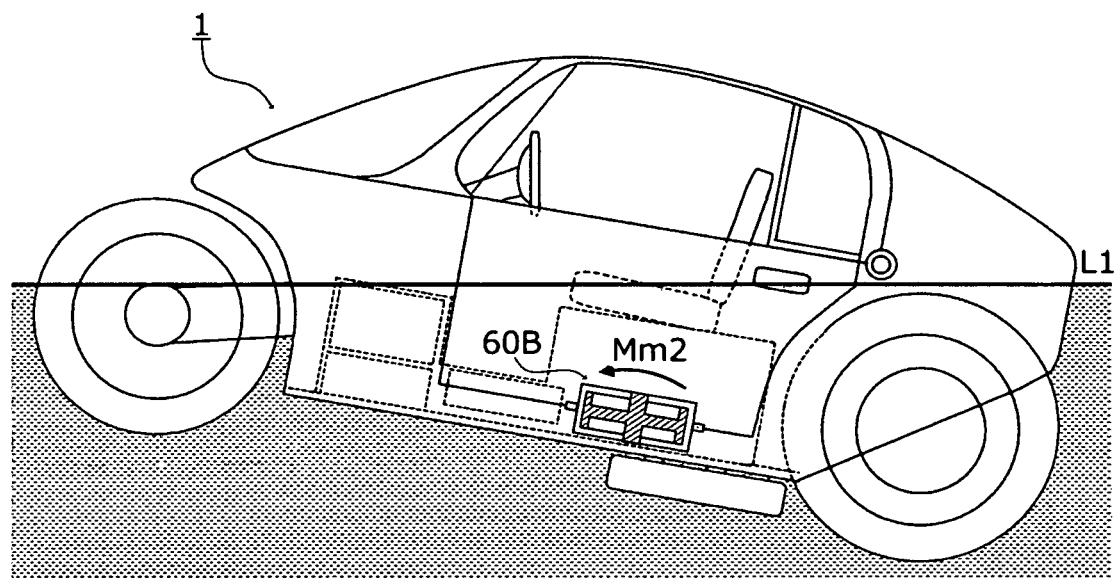
FIG. 15 is a diagram illustrating pitch reduction of the mobile apparatus on water.
Figure 15:
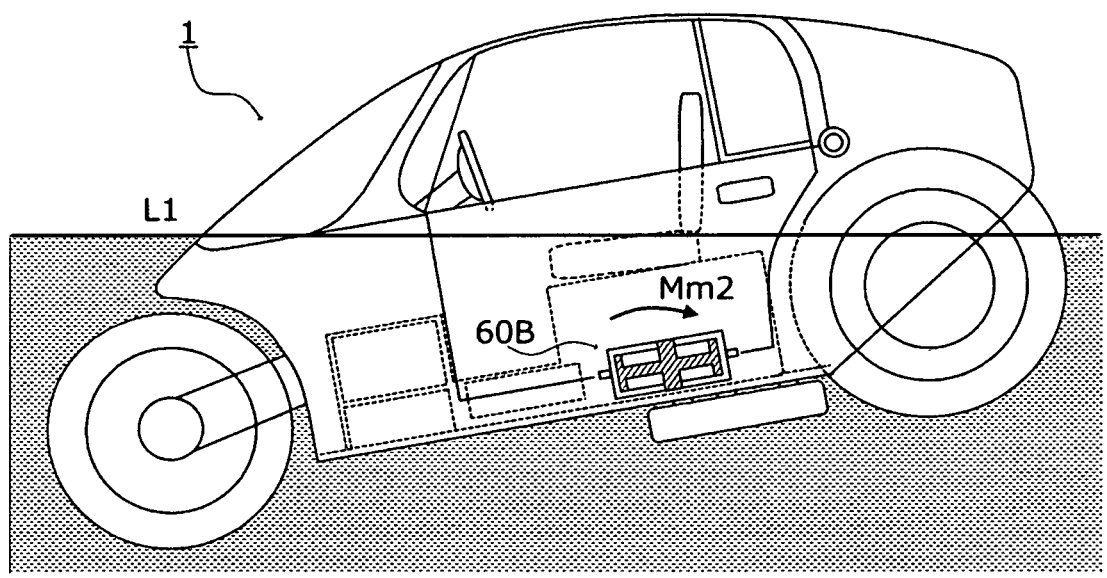

FIG. 13 is a block diagram illustrating an oscillation reducing action performed on water. FIG. 14 is a diagram illustrating roll reduction of the mobile apparatus 1 performed on water. FIG. 15 is a diagram illustrating pitch reduction of the mobile apparatus 1 performed on water.

As shown in FIG. 13, the mobile apparatus 1 detects the roll angle change amount ϕ and the pitch angle change amount Θ, which result from the oscillation of the mobile apparatus 1 caused by external torques T1 and T2, with the gyro sensor SR1. Then, the mobile apparatus 1 uses the gyro moment Mm produced by the gyro device 60 as a counter torque against the oscillation of the mobile apparatus 1.

As shown in FIG. 8, the mobile apparatus 1 in accordance with the present disclosure includes a plurality of gyro devices 60 serving as oscillation reducing devices. The gyro devices 60 are arranged so that their gimbal axes 62c intersect (are orthogonal to) each other. One of the gyro devices 60, namely, the gyro device 60B, is arranged so that when the actuator M3 is rotationally driven, the gimbal axis 62c becomes parallel to the mobile apparatus 1 and intersects (is orthogonal to) the gimbal axis 62c of the other gyro device 60.

On water, the mobile apparatus 1 is oscillated sideward in the roll direction about an axis parallel to the moving direction of the mobile apparatus 1 and oscillated in the pitch direction about an axis extending in a direction intersecting the moving direction of the mobile apparatus 1.

When the mobile apparatus 1 moves on water and external torques T1 and T2 resulting from waves act to oscillate the mobile apparatus 1 in leftward, rightward, frontward, and rearward directions, the orientation control unit 82 detects the roll angle change amount ϕ, resulting from oscillation of the mobile apparatus 1 in leftward and rightward directions, and the pitch angle change amount Θ, resulting from oscillation of the mobile apparatus 1 in frontward and rearward directions, with the gyro sensor SR1. Then, the orientation control unit 82 rotatably drives the tilt motor M2 of the oscillation reduction device 602 (gyro devices 60A and 60) to apply rotation torque to the gimbal shaft 62b. The rotation torque generates precession with the gyro devices 60A and 60B. This generates the gyro moment Mm1 and Mm2 at the gimbal shafts 62a and 62b. Thus, as shown schematically in FIGS. 13 and 14, the mobile apparatus 1 is moved while reducing oscillation by producing counter torque that acts against the oscillation of the mobile apparatus 1.

(2.4) Capsizing Prevention Action on Water

Figure 16:
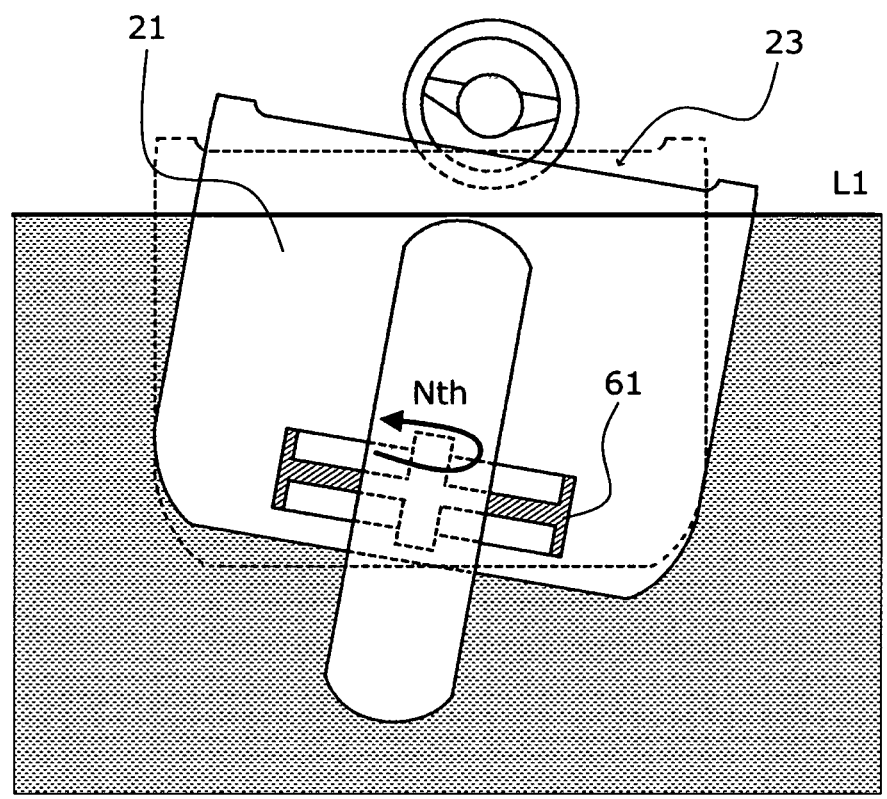
FIG. 16 is a diagram illustrating how the mobile apparatus is entered on water.

FIG. 16 is a diagram showing how to enter the mobile apparatus 1 on water. In a state in which the mobile apparatus 1 is stopped on water, when an occupant enters the cabin 20 of the mobile apparatus 1, the occupant lifts the canopy 24 of the mobile apparatus 1, which is located above the waterline, to open the hatch 23. Then, the occupant enters the mobile apparatus 1 from the left side or the right side. However, the mobile apparatus 1 is two-wheel and smaller in the widthwise direction, which intersects the moving direction, than the longitudinal direction. Thus, the mobile apparatus 1 may capsize when tilted toward the side from which the occupant enters.

In the present embodiment, when the occupant enters the cabin 20 of the mobile apparatus 1 in a state in which the mobile apparatus 1 is stopped, the orientation control unit 82 detects the roll angle change amount ϕ of the mobile apparatus 1 with the gyro sensor SR1. Then, as schematically shown in FIG. 16, the orientation control unit 82 increases the rotation speed N of the flywheel 61 to higher than the rotation speed Nth to increase the effective counter torque of the gyro device 60A from that for a normal moving state. This reduces sideward tilting of the mobile apparatus 1 to allow the occupant to easily enter the mobile apparatus 1 on water and prevent capsizing of the mobile apparatus 1 when the vehicle occupant enters the mobile apparatus 1.

The orientation control unit 82 may detect the roll angle change amount ϕ of the mobile apparatus 1 with the gyro sensor SR1 to rotationally drive the tilt motor M2 of the oscillation reduction device 602 (gyro device 60A) and apply rotation torque to the gimbal shaft 62b to generate the gyro moment Mm1 at the gimbal shafts 62a and 62b of the gyro device 60A as a counter torque acting against the tilting of the mobile apparatus 1. This will also prevent capsizing of the mobile apparatus 1.

Further, as shown in FIG. 7, the gimbal axis 62c of each of the two gyro devices 60A and 60B of the oscillation reduction device 602 can be rotated to a direction intersecting (orthogonal to) the moving direction of the mobile apparatus 1, and the gimbals 62 of the two gyro device 60A and 60B may be simultaneously rotated by the tilt motor M2 in accordance with the tilt of the mobile apparatus 1 to generate a large gyro moment Mm1 that reduces the tilt and prevents capsizing.

(2.5) Movement on Water

Figure 17:
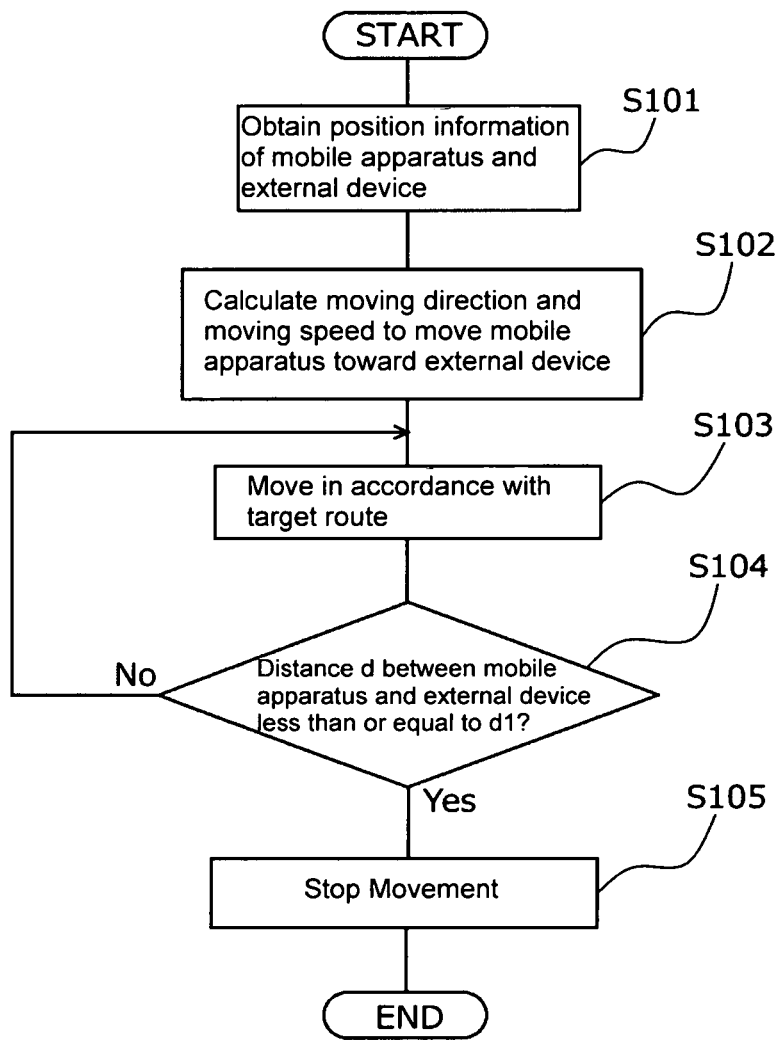
FIG. 17 is a flowchart showing one example of a process executed by a controller when moving along a target route set on water.

FIG. 17 is a flowchart illustrating the procedure of a process executed by the controller 80 when moving along a target route set on water. During a disaster such as an earthquake or heavy rain, the mobile apparatus 1 and the occupant may be swept out to water (sea) and drift separately in water. On water, the GPS receiver 831 provides the mobile apparatus 1 of the present embodiment with a signal indicating the moving direction, moving speed, and absolute geographical position of the mobile apparatus 1 with and position information of the external device P generated by the external device P, which may be a smartphone. The controller 80 uses the obtained position information to set a navigation route on water connecting the present position of the mobile apparatus 1 and the position of the external device P. Then, the controller 80 drives and controls the jet discharge device 50 to move along the set target route.

The controller 80 obtains the position information of the mobile apparatus 1 and the external device P provided by the GPS receiver 831 (S101). Then, the navigation control unit 84 uses the position information of the mobile apparatus 1 and the external device P to calculate the moving direction and moving speed of the mobile apparatus 1 in order to move the mobile apparatus 1 toward the external device P (S102). Further, the navigation control unit 84 drives the jet discharge device 50 to control and navigate the mobile apparatus 1 on water (S103).

Then, the navigation control unit 84 determines whether the distance d between the mobile apparatus 1 and the external device P is less than a predetermined distance d1 (S104). When a negative determination is given in step S104 (S104: No), the determination of step S104 is repeated until the distance d between the mobile apparatus 1 and the external device P becomes less than or equal to the distance d1. When determined in step S104 that the distance d between the mobile apparatus 1 and the external device P is less than or equal to the predetermined distance d1 (S104: Yes), the jet discharge device 50 is stopped (S105). This navigates the mobile apparatus 1 on water to where the occupant holding the external device P is located so that the occupant can open the canopy 24 and enter the cabin 20 from the hatch 23.

The mobile apparatus 1 in accordance with the present embodiment can be moved on land and water in a state in which the occupant is accommodated in the cabin 20 in a watertight state isolated from the outside. In particular, during a disaster such as an earthquake or heavy rain, the mobile apparatus 1 can move on land in a state in which the occupant is safely accommodated in the mobile apparatus 1 isolated from the outside while avoiding traffic more easily than a four-wheel vehicle. Even when swept out to sea, the mobile apparatus 1 can move on water with the occupant accommodated in the cabin 20 in a watertight state isolated from the outside. Further, when the mobile apparatus 1 is swept out to sea separately from the occupant, the mobile apparatus 1 can be navigated toward the external device P, which may be a smartphone carried by the occupant, along a target route calculated from the position information of the mobile apparatus 1 and the external device P.

As described above, the mobile apparatus 1 includes a remote steering unit and is controlled so that the two-wheel mobile apparatus can be automatically moved to a designated position in response to a remote steering instruction from a user. Further, the remote steering unit includes a GPS reception-transmission device, a reception response device for the remote steering instruction, a movement route determining unit that obtains a plurality of moving routes of the mobile apparatus 1 from the GPS position information and remote steering instruction and selects an optimal route from the plurality of moving routes, and an automatic steering device that automatically steers the mobile apparatus 1 based on the GPS position information of the destination and the selected moving route. The GPS position information includes information of the present position of the mobile apparatus 1 and position information of the destination received by the GPS reception-transmission device. The user is the owner of the mobile apparatus 1, a user who is registered in advance, or a remote-control center.

A central system (not shown) can operate and deploy the present disclosure to remotely operate many mobile apparatuses. This allows hundreds of mobile apparatuses to be developed on water to rescue and used to search for victims on water. A mobile apparatus can be automatically (remotely) steered to a safe location after accommodating a victim in the mobile apparatus.

What is claimed is:

1. A two-wheel mobile apparatus that is movable on land and water, the two-wheel mobile apparatus comprising:
   a cabin including a hatch that can be opened and closed, wherein the cabin is configured to be watertight to a height above a waterline when the mobile apparatus moves on water, and the cabin accommodates an occupant and isolates the occupant from an outer side of the cabin;
   a propulsion unit including an impeller that is rotatably driven, wherein the propulsion unit moves the mobile apparatus on water;
   an orientation detection unit that detects orientation of the mobile apparatus;
   a tilt correction unit that corrects tilt of the mobile apparatus on land;
   an oscillation reduction unit that reduces oscillation of the mobile apparatus on water; and
   an orientation control unit that switches between actuation of the tilt correction unit and actuation of the oscillation reduction unit based on a detection value of the orientation detection unit.

2. The two-wheel mobile apparatus according to claim 1, wherein the tilt correction unit and the oscillation reduction unit each are a gyro device coupled to a frame of the mobile apparatus, the gyro device includes:
   a flywheel that is rotatable and includes a rotation shaft parallel to a center of gravity direction of the mobile apparatus, and
   a gimbal surrounding the flywheel and supporting two ends of the rotation shaft, the gimbal being tiltable about two gimbal shafts that intersect the rotation shaft, wherein the gimbal shafts, which intersect the rotation shaft, are configured to be switchable between a direction parallel to a moving direction of the mobile apparatus and a direction intersecting the moving direction of the mobile apparatus.

3. The two-wheel mobile apparatus according to claim 2, wherein the orientation control unit tilts the gimbal based on a roll angle change amount of the mobile apparatus that is detected by the orientation detection unit and enables activation of the tilt correction unit.

4. The two-wheel mobile apparatus according to claim 2, wherein the orientation control unit tilts the gimbal based on a roll angle change amount of the mobile apparatus that is detected by the orientation detection unit and enables actuation of the oscillation reduction unit.

5. The two-wheel mobile apparatus according to claim 2, wherein the orientation control unit rotates the gimbal and tilts the gimbal based on a pitch angle change amount and a roll angle change amount of the mobile apparatus that are detected by the orientation detection unit and enables activation of the oscillation reduction unit.

6. The two-wheel mobile apparatus according to claim 2, wherein when the occupant enters the cabin in a state in which the mobile apparatus is stopped on water, the oscillation reduction unit rotates the flywheel at a rotation speed that is higher than a predetermined rotation speed so that the hatch remains above the waterline.

7. The two-wheel mobile apparatus according to claim 2, wherein in at least one of the gyro devices, the rotation shaft is rotated about the gimbal shaft so as to extend in a direction parallel to the moving direction of the mobile apparatus, and the rotation shaft of the flywheel is connected to a rotation shaft of the impeller of the propulsion unit.

8. The two-wheel mobile apparatus according to claim 1, further comprising a remote steering unit controlled to automatically move the two-wheel mobile apparatus to a designated position based on a remote steering instruction from a user.

9. The two-wheel mobile apparatus according to claim 8, wherein the remote steering unit includes:
   a GPS reception-transmission device;
   a reception response device for the remote steering instruction;
   a moving route determination device that obtains a plurality of moving routes of the two-wheel mobile apparatus based on GPS position information and the remote steering instruction and selects an optimal route from the plurality of moving routes; and
   an automatic steering device that automatically steers the two-wheel mobile apparatus based on GPS position information of a destination and the selected moving route.

10. The two-wheel mobile apparatus according to claim 9, wherein
   the GPS position information includes information of a present position of the mobile apparatus and position information of the destination received by the GPS reception-transmission device, and
   the user is an owner of the two-wheel mobile apparatus, a user who is registered in advance, or a remote-control center.

* * * * *